United States Patent
Endo et al.

(10) Patent No.: US 9,187,077 B2
(45) Date of Patent: Nov. 17, 2015

(54) CONTROL SYSTEM FOR VEHICLE

(71) Applicants: Hiroki Endo, Nissin (JP); Mikihisa Arai, Toyota (JP)

(72) Inventors: Hiroki Endo, Nissin (JP); Mikihisa Arai, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/222,072

(22) Filed: Mar. 21, 2014

(65) Prior Publication Data

US 2014/0297075 A1   Oct. 2, 2014

(30) Foreign Application Priority Data

Mar. 26, 2013  (JP) .................................. 2013-063904

(51) Int. Cl.
| | |
|---|---|
| *B60W 10/06* | (2006.01) |
| *B60W 10/30* | (2006.01) |
| *B60W 20/00* | (2006.01) |

(52) U.S. Cl.
CPC ............... *B60W 10/06* (2013.01); *B60W 10/30* (2013.01); *B60W 20/10* (2013.01); *B60K 2350/1092* (2013.01); *Y02T 10/6239* (2013.01); *Y10S 903/902* (2013.01)

(58) Field of Classification Search
CPC ..... B60W 10/06; B60W 10/30; B60W 20/10; B60K 2350/1092; Y02T 10/6239; Y10S 903/902

See application file for complete search history.

(56) References Cited

U.S. PATENT DOCUMENTS

| 2010/0168943 | A1 | 7/2010 | Fukushiro et al. | |
|---|---|---|---|---|
| 2011/0307134 | A1* | 12/2011 | Yoshimi | 701/22 |
| 2012/0240608 | A1* | 9/2012 | Ito et al. | 62/132 |

FOREIGN PATENT DOCUMENTS

| JP | 2002-059791 A | 2/2002 |
|---|---|---|
| JP | 2009-033947 A | 2/2009 |
| JP | 2011-057115 A | 3/2011 |
| JP | 2011-168203 A | 9/2011 |
| JP | 2012-131362 A | 7/2012 |
| JP | 2013-014219 A | 1/2013 |
| JP | 2013-095388 A | 5/2013 |

* cited by examiner

*Primary Examiner* — James Trammell
*Assistant Examiner* — James E Stroud
(74) *Attorney, Agent, or Firm* — Dinsmore & Shohl LLP

(57) ABSTRACT

An engine and a motor/generator are installed in a vehicle as drive sources. The vehicle is capable of traveling in a condition where the engine is stopped. A monitor varies an indicator in accordance with an operation performed by a driver and a condition of a device installed in the vehicle, and displays the indicator to the driver. When a startup condition based on the operation performed by the driver is satisfied, the device is stopped, and the engine is kept stopped until a predetermined delay time elapses. While the engine remains stopped, variation of the indicator is restricted.

5 Claims, 8 Drawing Sheets

US 9,187,077 B2

CONTROL SYSTEM FOR VEHICLE

INCORPORATION BY REFERENCE

The disclosure of Japanese Patent Application No. 2013-063904 filed on Mar. 26, 2013 including the specification, drawings and abstract is incorporated herein by reference in its entirety.

BACKGROUND OF THE INVENTION

1. Field of the Invention

The invention relates to a control system for a vehicle, and more particularly to a technique, employed in a vehicle installed with an engine and an electric motor as drive sources, of displaying an indicator in accordance with an operation performed by a driver and a condition of a device installed in the vehicle.

2. Description of Related Art

A vehicle installed with an electric motor for use during travel in addition to an engine is available. In this type of vehicle, travel can be performed using the electric motor alone while the engine is stopped. When a large driving force is required, such as when an accelerator depression amount is increased, the engine is started in order to realize the required driving force.

Japanese Patent Application Publication No. 2009-33947 (JP 2009-33947 A) discloses, in paragraph [0060] and so on, a technique of starting the engine following a predetermined time delay rather than starting the engine immediately.

As described above, in a vehicle installed with an electric motor as a drive source, travel can be performed while the engine is stopped, and in this travel condition, a driver cannot recognize how much power is being consumed when an engine rotation speed is displayed in a conventional manner. Therefore, a power or the like of the vehicle is displayed instead of or in addition to the engine rotation speed. The displayed power may vary in accordance with the accelerator depression amount and an operating condition of a device such as an air-conditioning device.

Certain drivers, however, do not take into consideration the power that is consumed by an in-vehicle device, and therefore such drivers may experience a sense of discomfort when the displayed power varies in response to variation in the condition of the in-vehicle device. This situation may arise when startup of the engine is delayed as described in JP 2009-33947 A. In other words, the displayed power may vary in response to variation in the condition of the in-vehicle device even though the engine has not been started.

SUMMARY OF THE INVENTION

The invention provides a control system for a vehicle with which a sense of discomfort experienced by a driver is reduced.

According to an aspect of the invention, a vehicle is installed with an engine and an electric motor as drive sources so as to be capable of traveling in a condition where the engine is stopped. A control system for the vehicle includes: a display device that varies an indicator in accordance with an operation performed by a driver and a condition of a device installed in the vehicle, and displays the indicator to the driver; and a controller that stops the device and keeps the engine stopped until a predetermined delay time elapses when a startup condition based on the operation performed by the driver is satisfied. The display device restricts variation of the indicator while the engine remains stopped. Hence, variation of the indicator resulting only from variation in a condition of an in-vehicle device can be suppressed, and as a result, a sense of discomfort experienced by a driver who does not realize that the indicator may vary in accordance with the condition of the in-vehicle device can be reduced.

According to another aspect, the display device may keep the indicator constant while the engine remains stopped. As a result, during an engine startup delay, the indicator can be kept constant in a condition at the time of satisfaction of the startup condition.

According to a further aspect, the display device may make the indicator larger when the engine is started. As a result, startup of the engine can be indicated by the indicator.

According to a further aspect, the display device may display a message indicating that the engine is stopped while the engine remains stopped. In so doing, the driver can be notified of the fact that the engine is stopped contrary to the intentions of the driver. As a result, a sense of discomfort that may be experienced by the driver when the engine is not started can be reduced.

According to a further aspect, the startup condition may be a condition that is satisfied when a parameter calculated to vary in accordance with the operation performed by the driver is larger than a threshold. The indicator indicates the parameter, and the display device displays the threshold together with the indicator. As a result, the driver can visually recognize whether or not the startup condition is satisfied.

According to a further aspect, the parameter may be an output power of the vehicle. As a result, the driver can visually recognize the output power of the vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is a view showing a condition of an engine and so on;

DETAILED DESCRIPTION OF EMBODIMENTS

An embodiment of the invention will be described below with reference to the drawings. In the following description, identical components have been allocated identical reference symbols. Names and functions of these components are also identical. Accordingly, detailed description of these components will not be repeated.

Figure 1:
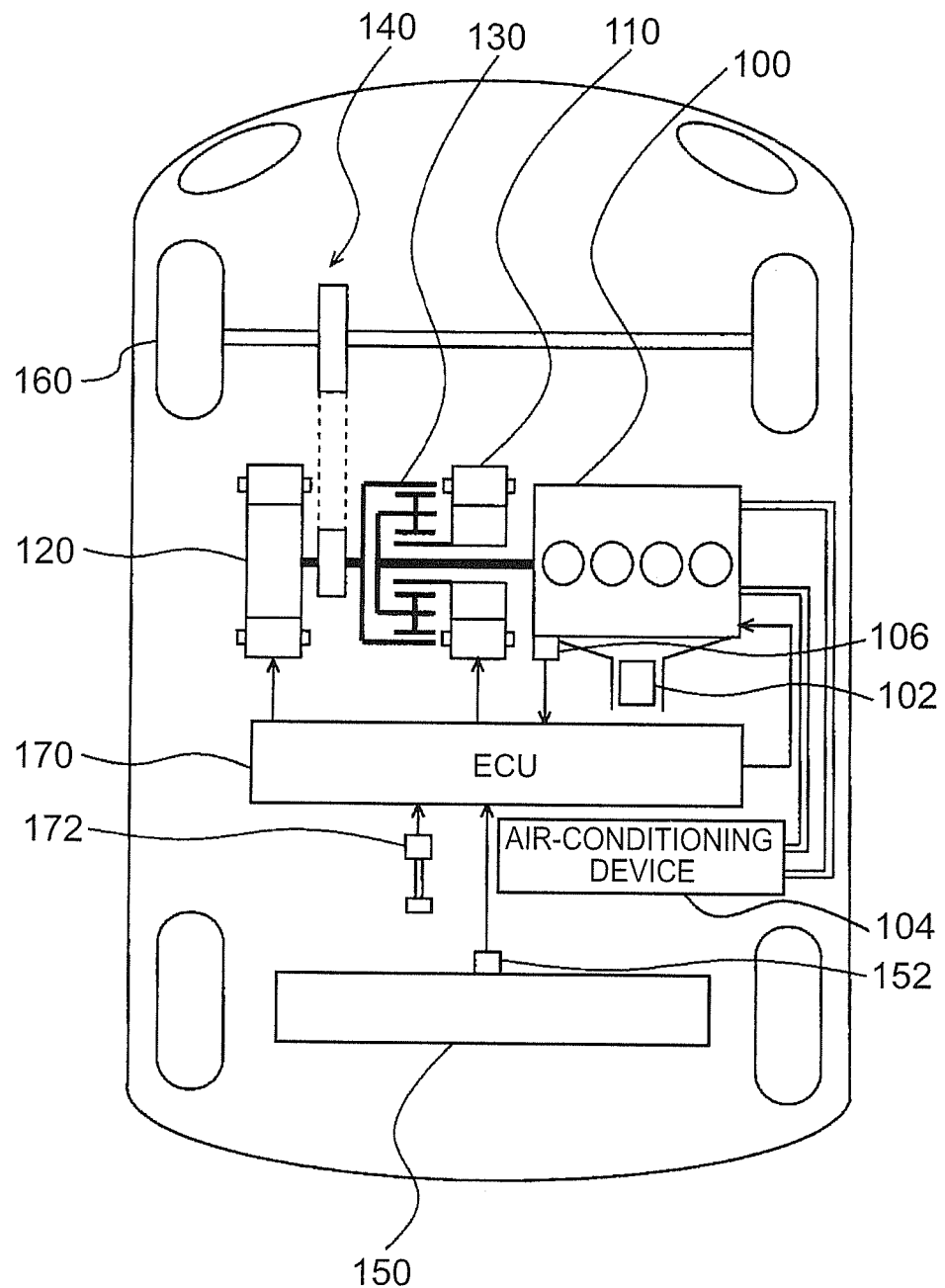
FIG. 1 is a schematic view showing a configuration of a vehicle.

Referring to FIG. 1, a vehicle is installed with an engine 100, a first motor/generator 110, a second motor/generator 120, a power distribution mechanism 130, a reduction gear 140, and a battery 150.

The engine 100, the first motor/generator 110, the second motor/generator 120, and the battery 150 are controlled by an electronic control unit (ECU) 170. The ECU 170 may be divided into a plurality of ECUs.

The vehicle travels using driving force from at least one of the engine 100 and the second motor/generator 120. In other words, one or both of the engine 100 and the second motor/generator 120 is selected automatically as a drive source in accordance with an operating condition.

For example, the engine 100 and the second motor/generator 120 are controlled in accordance with a result of an operation of an accelerator pedal 172 performed by a driver. An operation amount (an accelerator depression amount) of the accelerator pedal 172 is detected by an accelerator depression amount sensor (not shown).

When the accelerator depression amount is small, when a vehicle speed is low, and so on, the vehicle travels using only the second motor/generator 120 as the drive source. In this case, the engine 100 is stopped. In certain cases, however, the engine 100 may be driven for the purpose of power generation or the like.

When the accelerator depression amount is large, when the vehicle speed is high, when a state of charge (SOC) of the battery 150 is small, and so on, the engine 100 is driven. In this case, the vehicle travels using either the engine 100 alone or both the engine 100 and the second motor/generator 120 as drive sources.

The engine 100 is an internal combustion engine. A crankshaft serving as an output shaft rotates when an air-fuel mixture of fuel and air is burned in a combustion chamber. Exhaust gas discharged from the engine 100 is purified by a catalyst 102 and then discharged to the outside of the vehicle. The catalyst 102 exhibits a purification action when warmed to a predetermined temperature. The catalyst 102 is warmed using heat from the exhaust gas. The catalyst 102 is a three-way catalyst, for example.

Cooling water of the engine 100 circulates through an air-conditioning device 104 installed in the vehicle. The air-conditioning device 104 heats air in a vehicle cabin using the cooling water of the engine 100. More specifically, the cooling water is introduced into a heater core and subjected to heat exchange with air therein such that warmed air is discharged into the vehicle cabin. Typical conventional techniques may be employed in the air-conditioning device 104, and therefore these techniques will not be described in detail here. A temperature of the cooling water of the engine 100 is detected by a temperature sensor 106.

The engine 100, the first motor/generator 110, and the second motor/generator 120 are connected via the power distribution mechanism 130. Power generated by the engine 100 is distributed to two paths by the power distribution mechanism 130. One path is a path for driving a front wheel 160 via the reduction gear 140, and the other path is a path for driving the first motor/generator 110 in order to generate power.

The first motor/generator 110 is a three-phase alternating current rotating electric machine including a U phase coil, a V phase coil, and a W phase coil. The first motor/generator 110 generates power using the power of the engine 100 distributed thereto by the power distribution mechanism 130. The power generated by the first motor/generator 110 is used differently depending on a travel condition of the vehicle and the SOC of the battery 150. For example, during normal travel, the power generated by the first motor/generator 110 is used as is as power for driving the second motor/generator 120. When the SOC of the battery 150 is lower than a predetermined value, on the other hand, the power generated by the first motor/generator 110 is converted from an alternating current to a direct current by an inverter, to be described below. The power is then adjusted by a converter, to be described below, and stored in the battery 150.

When the first motor/generator 110 is used as a power generator, the first motor/generator 110 generates negative torque. Here, negative torque is torque that acts as a load on the engine 100. When the first motor/generator 110 is used as a motor upon reception of a power supply, the first motor/generator 110 generates positive torque. Here, positive torque is torque that does not act as a load on the engine 100, or in other words torque that assists rotation of the engine 100. Note that this applies likewise to the second motor/generator 120.

The second motor/generator 120 is a three-phase alternating current rotating electric machine including a U phase coil, a V phase coil, and a W phase coil. The second motor/generator 120 is driven by at least one of the power stored in the battery 150 and the power generated by the first motor/generator 110.

Driving force from the second motor/generator 120 is transmitted to the front wheel 160 via the reduction gear 140. The second motor/generator 120 thus assists the engine 100 and causes the vehicle to travel using the driving force from the second motor/generator 120. Note that a rear wheel may be driven instead of, or in addition to, the front wheel 160.

During regenerative braking by the vehicle, the second motor/generator 120 is driven by the front wheel 160 via the reduction gear 140 such that the second motor/generator 120 operates as a power generator. The second motor/generator 120 thus operates as a regenerative brake that converts braking energy into electric power. The power generated by the second motor/generator 120 is stored in the battery 150.

The power distribution mechanism 130 is constituted by a planetary gear including a sun gear, a pinion gear, a carrier, and a ring gear. The pinion gear is engaged to the sun gear and the ring gear. The carrier supports the pinion gear to be capable of rotating. The sun gear is coupled to a rotary shaft of the first motor/generator 110. The carrier is coupled to the crankshaft of the engine 100. The ring gear is coupled to a rotary shaft of the second motor/generator 120 and the reduction gear 140.

Since the engine 100, the first motor/generator 110, and the second motor/generator 120 are coupled to each other via the power distribution mechanism 130 constituted by a planetary gear, respective rotation speeds of the engine 100, the first motor/generator 110, and the second motor/generator 120 can be linked by a straight line on a collinear diagram.

The battery 150 is a battery pack formed by connecting a plurality of battery modules in series, wherein each battery module is constituted by a plurality of integrated battery cells. A voltage of the battery 150 is approximately 200 V, for example. In addition to the power of the first motor/generator 110 and the second motor/generator 120, the battery 150 is charged with power supplied from a power supply on the outside of the vehicle. Note that a capacitor may be used instead of or in addition to, the battery 150. A temperature of the battery 150 is detected by a temperature sensor 152.

Figure 2:
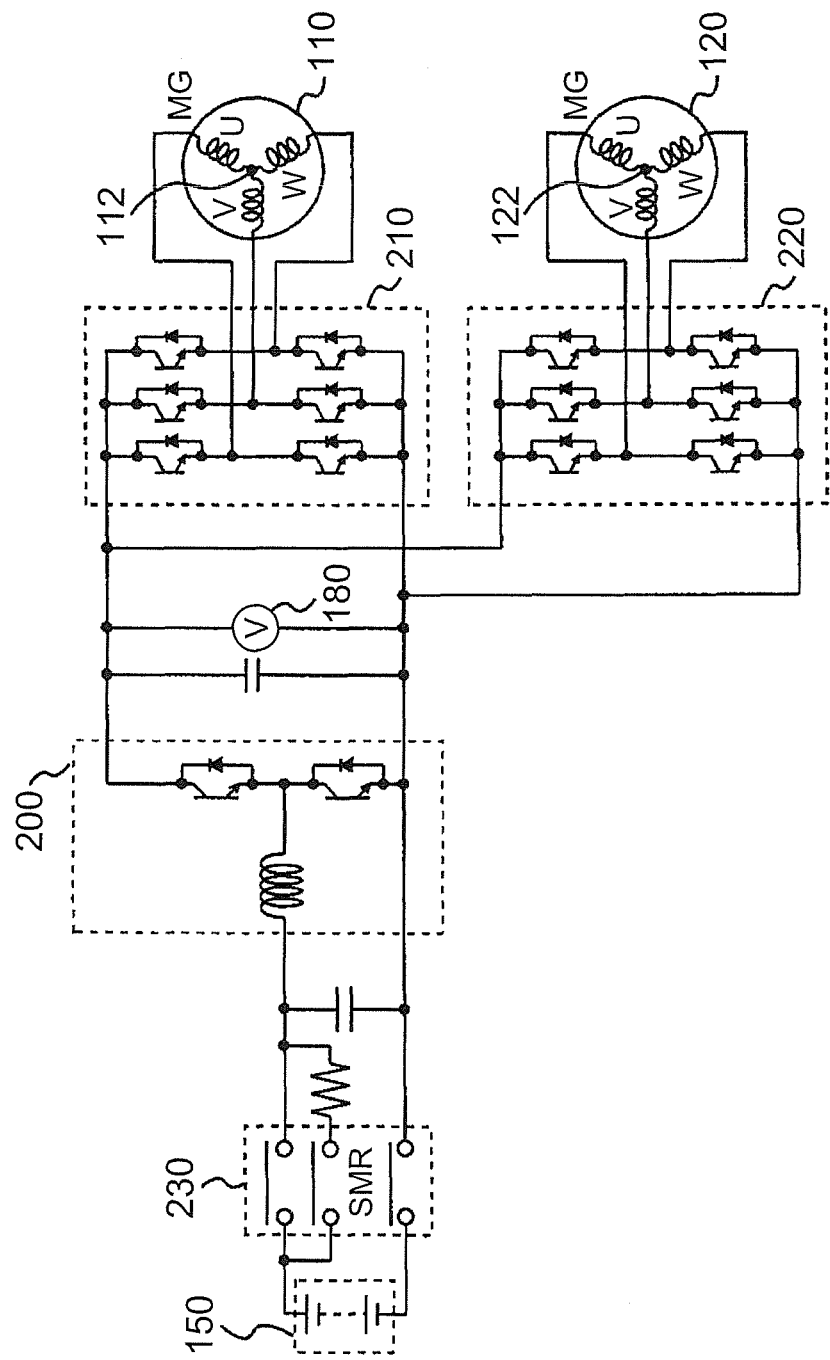
FIG. 2 is a view showing an electric system of the vehicle.

Referring to FIG. 2, the vehicle is provided with a converter 200, a first inverter 210, a second inverter 220, and a system main relay 230.

The converter 200 includes a reactor, two npn type transistors, and two diodes. The reactor is connected at one end to a positive electrode side of each battery, and connected at another end to a connection point between the two npn type transistors.

The two npn type transistors are connected in series. The npn type transistors are controlled by the ECU 170. A diode is connected between a collector and an emitter of each npn type transistor such that a current flows from the emitter side to the collector side.

An insulated gate bipolar transistor (IGBT), for example, may be used as the npn type transistor. A power switching element such as a power metal oxide semiconductor field-effect transistor (MOSFET) may be used instead of the npn type transistor.

When power discharged from the battery 150 is supplied to the first motor/generator 110 or the second motor/generator 120, a voltage is boosted by the converter 200. Conversely, when the power generated by the first motor/generator 110 or the second motor/generator 120 is charged to the battery 150, the voltage is stepped down by the converter 200.

A system voltage VH between the converter 200 and each inverter is detected by a voltage sensor 180. A detection result obtained by the voltage sensor 180 is transmitted to the ECU 170.

The first inverter 210 includes a U phase arm, a V phase arm, and a W phase arm. The U phase arm, the V phase arm, and the W phase arm are connected in parallel. The U phase arm, the V phase arm, and the W phase arm respectively include two npn type transistors connected in series. A diode is connected between a collector and an emitter of each npn type transistor such that a current flows from the emitter side to the collector side. Connection points between the respective npn type transistors of the respective arms are connected to different end portions to neutral points 112 of the respective coils of the first motor/generator 110.

The first inverter 210 converts a direct current supplied from the battery 150 into an alternating current, and supplies the alternating current to the first motor/generator 110. Further, the first inverter 210 converts the alternating current generated by the first motor/generator 110 into a direct current.

The second inverter 220 includes a U phase arm, a V phase arm, and a W phase arm. The U phase arm, the V phase arm, and the W phase arm are connected in parallel. The U phase arm, the V phase arm, and the W phase arm respectively include two npn type transistors connected in series. A diode is connected between a collector and an emitter of each npn type transistor such that a current flows from the emitter side to the collector side. Connection points between the respective npn type transistors of the respective arms are connected to different end portions to neutral points 122 of the respective coils of the second motor/generator 120.

The second inverter 220 converts the direct current supplied from the battery 150 into an alternating current, and supplies the alternating current to the second motor/generator 120. Further, the second inverter 220 converts the alternating current generated by the second motor/generator 120 into a direct current.

The converter 200, the first inverter 210, and the second inverter 220 are controlled by the ECU 170.

The system main relay 230 is provided between the battery 150 and the converter 200. The system main relay 230 is a relay that switches the battery 150 and an electric system between a connected condition and a disconnected condition. When the system main relay 230 is in an open condition, the battery 150 is disconnected from the electric system. When the system main relay 230 is in a closed condition, the battery 150 is connected to the electric system.

The condition of the system main relay 230 is controlled by the ECU 170. For example, the system main relay 230 is closed when the ECU 170 is activated and opened when the ECU 170 is stopped.

Figure 3:
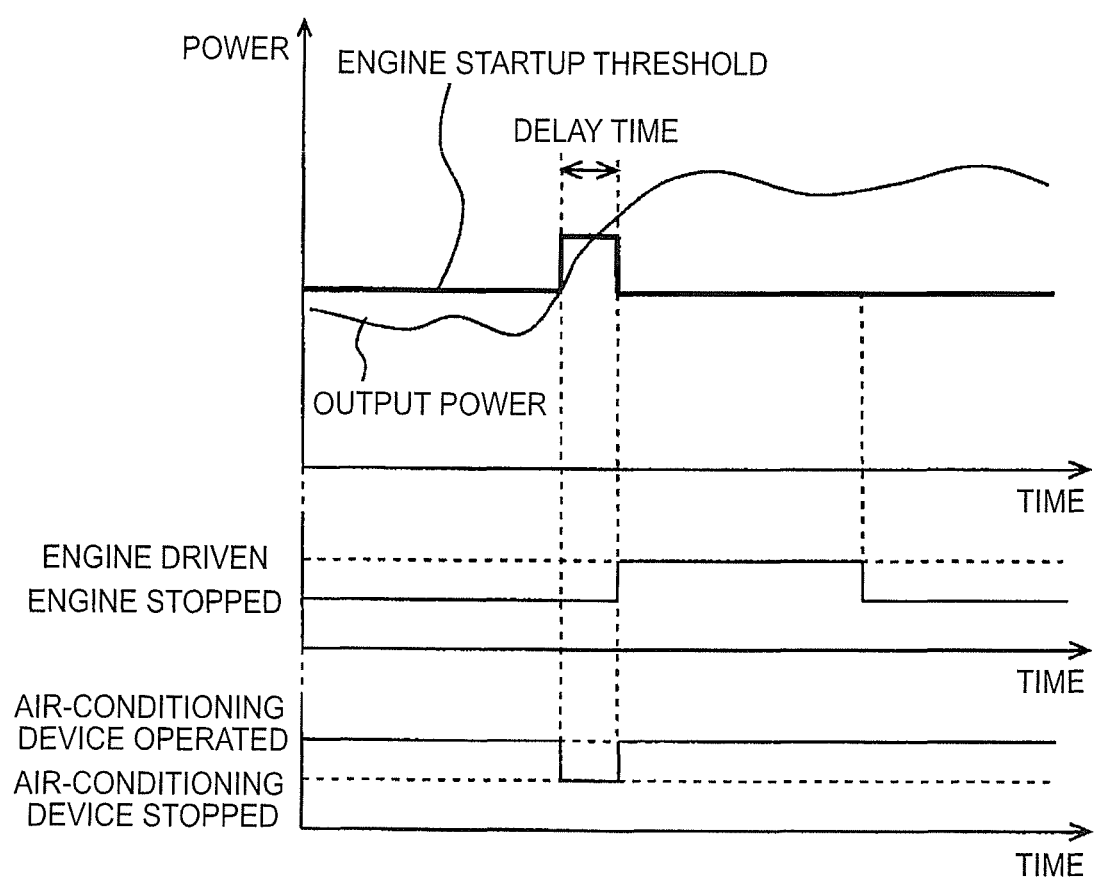

Referring to FIG. 3, control of the engine 100 will be described further. When an output power of the vehicle, shown in FIG. 3, is smaller than an engine startup threshold, the vehicle travels using only the driving force of the second motor/generator 120. In this case, as a rule, a fuel supply to the engine 100 is halted such that the engine 100 is stopped.

The output power is set as the power used by the vehicle to travel. The output power is calculated by the ECU 170 in accordance with a map based on the accelerator depression amount, the vehicle speed, and so on, for example. In other words, the output power is a parameter calculated to vary in accordance with an operation performed by the driver. Note that an output power calculation method is not limited to the method described above. Further, the torque, an acceleration, the driving force, the accelerator depression amount, and so on may be used instead of the output power. For example, the engine 100 may be stopped when the accelerator depression amount becomes smaller than a threshold determined for each vehicle speed.

The engine startup threshold is determined in advance by a developer on the basis of results of experiments, simulations, and so on. Further, in this embodiment, the engine startup threshold is determined to differ according to an operating condition of a device (the air-conditioning device 104, for example) installed in the vehicle. As an example, the engine startup threshold used when the air-conditioning device 104 is operative is smaller than the engine startup threshold used when the air-conditioning device 104 is stopped.

Figure 4:
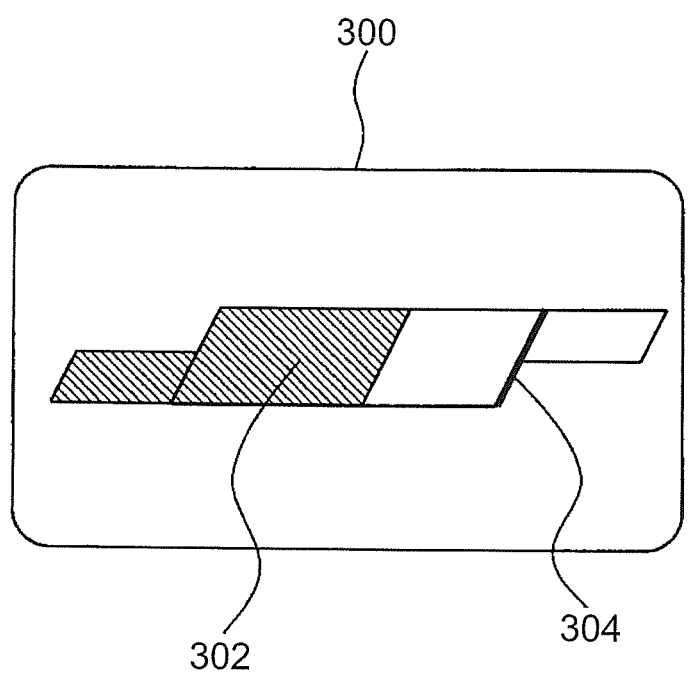
FIG. 4 is a first view showing an indicator.

The output power is indicated to the driver by an indicator 302 displayed on a monitor 300 shown in FIG. 4. In this embodiment, the indicator 302 is represented by shading. The monitor 300 displays an engine startup threshold 304 together with the indicator 302 representing the output power. The monitor 300 is provided on an instrument panel in a front portion of the vehicle cabin.

FIG. 4 shows a condition in which the output power is smaller than the engine startup threshold 304. The indicator 302 is displayed so as to increase in size as the output power increases. Hence, the indicator 302 is displayed to the driver so as to vary in accordance with the operation performed by the driver.

Figure 5:
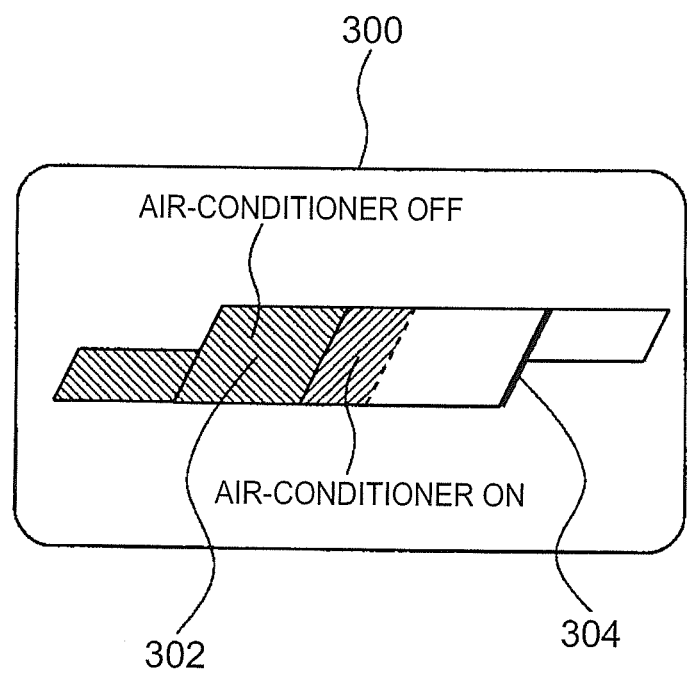
FIG. 5 is a second view showing the indicator.

The output power indicated by the indicator 302 on the monitor 300 is displayed in relation to the engine startup threshold 304. Hence, when the engine startup threshold 304 is modified, the size of the indicator 302 is modified without modifying the position of the engine startup threshold 304. For example, when the air-conditioning device 104 is stopped, the indicator 302 on the monitor 300 may be reduced in size, as shown in FIG. 5, in accordance with the increase in the engine startup threshold 304. Thus, the indicator 302 is varied in accordance with the operation performed by the driver and the condition of the device installed in the vehicle.

Returning to FIG. 3, the engine 100 is driven when a startup condition based on the operation performed by the driver is satisfied, for example when the output power of the vehicle reaches or exceeds the engine startup threshold. The engine 100 is started by cranking the engine 100 using the first motor/generator 110, for example. As a result, the vehicle travels using the driving force of the engine 100 in addition to, or instead of, the driving force of the second motor/generator 120. Further, using the driving force of the engine 100, the power generated by the first motor/generator 110 is supplied directly to the second motor/generator 120.

In this embodiment, as shown in FIG. 3, when the output power of the vehicle reaches or exceeds the engine startup threshold, or in other words when the startup condition based on the operation performed by the driver is satisfied, the device (the air-conditioning device 104, for example) installed in the vehicle is stopped, and the engine 100 is kept in a stopped condition until a predetermined delay time elapses. Accordingly, when the delay time elapses following satisfaction of the startup condition, the engine 100 is started and the air-conditioning device 104 is reactivated.

Note that when the output power falls below a predetermined engine stoppage threshold, which is smaller than the engine startup threshold, before the delay time elapses following satisfaction of the startup condition, the engine 100 is not started. The air-conditioning device 104, however, is reactivated. The delay time is determined in advance by the developer on the basis of results of experiments, simulations, and so on.

Figure 6:
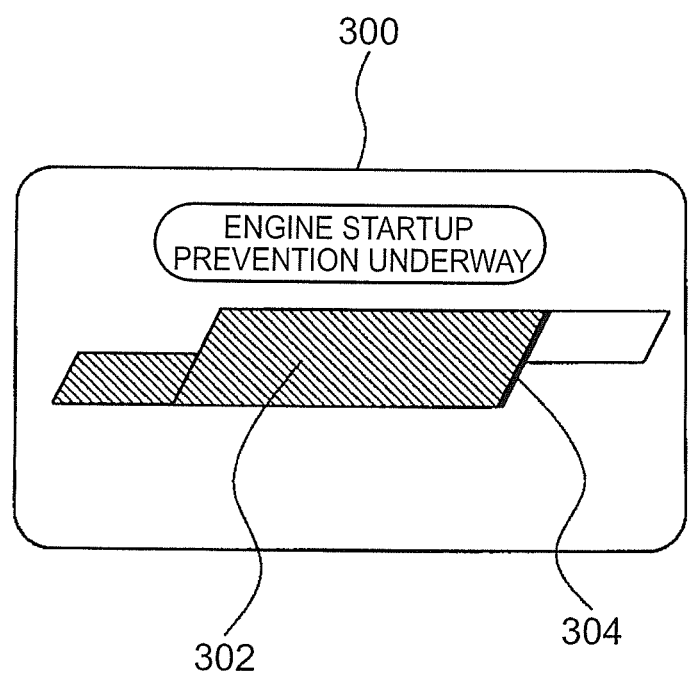
FIG. 6 is a third view showing the indicator.

As shown in FIG. 6, during the delay time following satisfaction of the startup condition, or in other words while the engine remains stopped following satisfaction of the startup condition, variation of the indicator 302 is restricted so that the indicator 302 does not exceed the engine startup threshold 304. More specifically, the output power indicated by the indicator 302 is displayed to match the engine startup threshold 304.

To indicate the output power accurately using the indicator 302, the indicator 302 should be reduced in size in response to stoppage of the air-conditioning device 104 when the startup condition is satisfied. However, when the indicator 302 is reduced in size in response to stoppage of the air-conditioning device 104, a driver who does not realize that the output power may vary in accordance with the air-conditioning device 104 may experience a sense of discomfort. In this embodiment, to reduce this sense of discomfort, variation of the indicator 302 is restricted. More specifically, the indicator 302 is kept constant, as described above. Further, while the engine 100 remains stopped, the monitor 300 displays a message indicating that the engine 100 is stopped.

Figure 7:
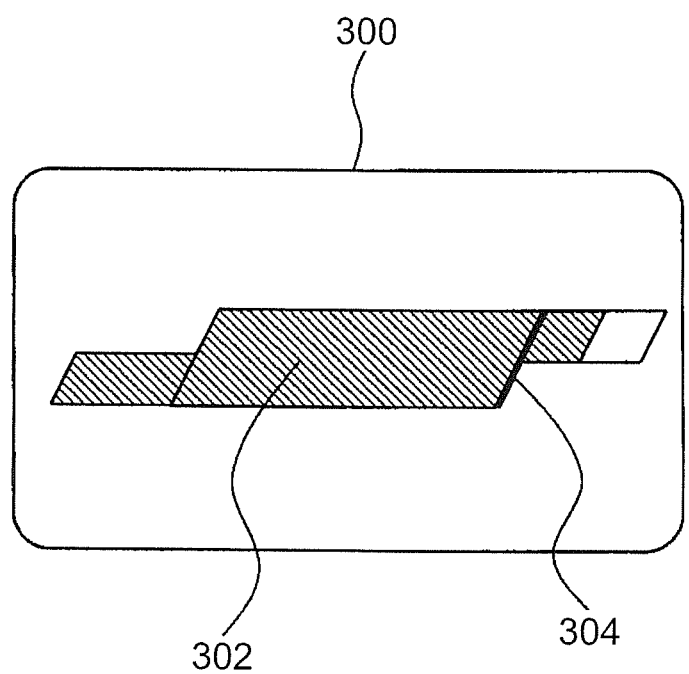
FIG. 7 is a fourth view showing the indicator.

After the engine 100 is started, as shown in FIG. 7, the indicator 302 is increased in size so that the output power is displayed accurately. FIG. 7 shows a condition in which the output power is larger than the engine startup threshold 304.

Figure 8:
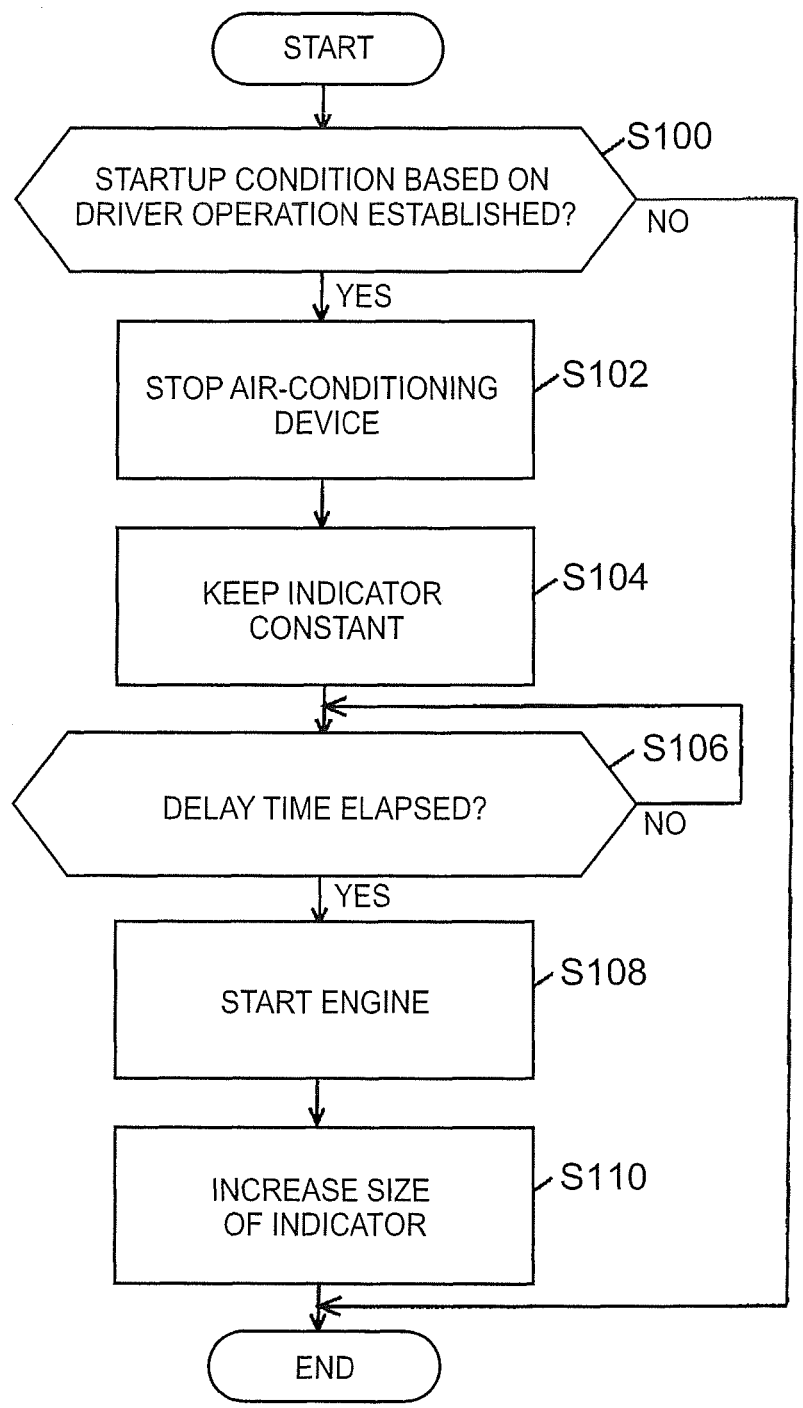
FIG. 8 is a flowchart showing processing executed by an electronic control unit (ECU).

Referring to FIG. 8, processing executed by the ECU 170 according to this embodiment will be described. The processing may be realized using software, hardware, or a combination of software and hardware.

In step (hereafter, step will be abbreviated to S) 100, a determination is made as to whether or not the startup condition based on the operation performed by the driver is satisfied. When the startup condition based on the operation performed by the driver is satisfied (YES in S100), the air-conditioning device 104 is stopped in S102. Note that any other device that may consume the output power of the vehicle when operated may be stopped instead of the air-conditioning device 104.

Further, in S104, the indicator 302 on the monitor 300 is kept constant. When the delay time subsequently elapses (YES in S106), the engine is started in S108. Further, in S110, the indicator 302 is increased in size.

The embodiments disclosed herein are to be considered in all aspects thereof exemplary and not limiting. The scope of the invention is defined by the claims rather than the above description, and is intended to include all equivalent definitions to the claims and all modifications within the scope of the claims.

What is claimed is:

1. A control system for a vehicle that is installed with an engine and an electric motor as drive sources so as to travel in a condition where the engine is stopped, comprising:
   a display device configured to vary an indicator in accordance with an operation performed by a driver and a condition of a device installed in the vehicle, and display the indicator to the driver; and
   a controller configured to, when a startup condition based on the operation performed by the driver is satisfied, stop the operation of the device installed in the vehicle and keep the engine stopped until a predetermined delay time elapses from when the startup condition is satisfied,
   wherein the display device is configured to keep the indicator constant while the engine remains stopped,
   wherein the startup condition is a condition that is satisfied when an output power of the vehicle is larger than a threshold, the output power is calculated to vary in accordance with the operation performed by the driver,
   wherein the indicator indicates the output power of the vehicle.

2. The control system for a vehicle according to claim 1, wherein the display device is configured to make the indicator larger when the engine is started.

3. The control system for a vehicle according to claim 1, wherein the display device is configured to display a message indicating that the engine is stopped while the engine remains stopped.

4. The control system for a vehicle according to claim 1, wherein
   the display device is configured to display the threshold together with the indicator.

5. A control system for a vehicle that is installed with an engine and an electric motor as drive sources so as to travel in a condition where the engine is stopped, comprising:
   a display device configured to vary an indicator that indicates an output power of the vehicle and a condition of a device installed in the vehicle, the output power of the vehicle is calculated in accordance with an operation performed by a driver, the display device configured to display the indicator to the driver; and
   a controller configured to stop the operation of the device installed in the vehicle and keep the engine stopped until a predetermined delay time elapses from a startup condition based on the operation performed by the driver is satisfied,
   wherein the display device is configured to restrict variation of the indicator while the engine remains stopped.

* * * * *